(12) United States Patent
Arakawa

(10) Patent No.: US 6,528,977 B2
(45) Date of Patent: Mar. 4, 2003

(54) POWER SUPPLY SYSTEM PROVIDED WITH PHOTOVOLTAIC GENERATOR

(75) Inventor: Shinichi Arakawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/995,672

(22) Filed: Nov. 29, 2001

(65) Prior Publication Data

US 2002/0063552 A1 May 30, 2002

(30) Foreign Application Priority Data

Nov. 29, 2000  (JP) ........................................ 2000-363098

(51) Int. Cl.$^7$ ............................ H02M 7/00; G05F 1/40; G05F 1/44
(52) U.S. Cl. ........................ 323/282; 323/906; 363/124
(58) Field of Search .................... 323/906, 282, 323/284; 363/124

(56) References Cited

U.S. PATENT DOCUMENTS 5,604,430 A * 2/1997 Decker et al. ............... 323/275
6,281,485 B1 * 8/2001 Siri ............................. 323/906
6,316,925 B1 * 11/2001 Canter ......................... 323/282

* cited by examiner

Primary Examiner—Bao Q. Vu
(74) Attorney, Agent, or Firm—Arent Fox Kintner Plotkin & Kahn, PLLC

(57) ABSTRACT

A power supply system includes a photovoltaic generator, a load to which electric power is supplied from the photovoltaic generator, an electrical system for receiving a portion of the electric power generated by the photovoltaic generator and supplying electric power to the load, and a control unit for controlling the reception and the supply of the electrical power by the electrical system. To ensure that the photovoltaic generator generates electric power at an optimal operational point, the control unit is adapted to not operate when the maximum electric power $P_{max}$ generated by the photovoltaic generator and an electric power $P_L$ consumed in the load are equal to each other, and to be operated when $P_{max} > P_L$, thereby permitting the electrical system to receive a surplus electric power $\Delta P_1$, and to be operated when $P_{max} < P_L$, thereby supplying a deficient electric power $\Delta P_2$ from the electrical system to the load.

20 Claims, 4 Drawing Sheets

POWER SUPPLY SYSTEM PROVIDED WITH PHOTOVOLTAIC GENERATOR

BACKGROUND OF THE INVENTION

1. Field of the Invention

The present invention relates to a power supply system provided with a photovoltaic generator.

2. Description of the Related Art

Conventional systems are known in which a photovoltaic generator and a load are connected to each other through a DC/AC inverter (for example, see Japanese Patent Application Laid-open No. 6-133462).

To conduct the generation of electric power by a photovoltaic generator with the best efficiency, it is required that the operational point of the photovoltaic generator is brought into an optimal operational point.

However, the optimal operational point varies with the variation in insolation amount, and on the other hand, the current-voltage characteristic of the load is substantially constant and the operational point of the photovoltaic generator is determined by the current-voltage characteristic of the load. For this reason, it is difficult in the conventionally known system to keep the operational point of the photovoltaic generator always at the optimal operational point.

SUMMARY OF THE INVENTION

Accordingly, it is an object of the present invention to provide a power supply system of the above-described type, wherein the operational point of the photovoltaic generator is kept at the optimal operational point, and a required electric power can be supplied stably to the load.

To achieve the above object, according to the present invention, there is provided a power supply system comprising a photovoltaic generator, a load to which electric power is supplied from the photovoltaic generator, an electrical system capable of receiving a portion of the electric power generated by the photovoltaic generator and supplying the electric power to the load, and a control unit for controlling the reception and supply of the electric power by the electrical system. In order to ensure that the photovoltaic generator generates electric power at an optimal operational point, the control unit adapted in such a manner so as to not operate when the maximum electric power $P_{max}$ generated by the photovoltaic generator and an electric power $P_L$ consumed by the load are equal to each other ($P_{max}=P_L$), and to operate when $P_{max}>P_L$, thereby permitting the electrical system to receive surplus electric power $\Delta P_1$ ($=P_{max}-P_L$), and to operate when $P_{max}<P_L$, thereby supplying a deficient electric power $\Delta P_2$ ($=P_L-P_{max}$) from the electrical system to the load.

With the above arrangement, when the maximum electric power $P_{max}$ generated by the photovoltaic generator and the electric power $P_L$ consumed by the load are equal to each other ($P_{max}=P_L$), the load is operated, and the current-voltage characteristic of the load corresponds to the optimal operational point of the photovoltaic generator and hence, the operational point of the photovoltaic generator is at the optimal operational point. In this case, the control unit need not be operated.

When $P_{max}>P_L$, the load is operated, but the current-voltage characteristic of the load does not correspond to the optimal operational point of the photovoltaic generator and hence, the operational point of the photovoltaic generator is not at the optimal operational point. Then, if the surplus electric power $\Delta P_1$ is allowed to be received in the electrical system, the same state is provided as when the power consumed in the load is equal to $P_L+\Delta P_1$. Namely, the current-voltage characteristic of the load corresponds to the optimal operational point of the photovoltaic generator, because $P_{max}=P_L+\Delta P_1$. Thus, the operational point for the photovoltaic generator is at the optimal operational point.

When $P_{max}<P_L$, the load is incapable of being operated. Therefore, if the deficient electric power $\Delta P_2$ is supplied from the electrical system to the load, the load is operated to provide the same state as when the electric power consumed in the load is equal to $P_L-\Delta P_2$. Namely, the current-voltage characteristic of the load corresponds to the optimal operational point of the photovoltaic generator, whereby the operational point of the photovoltaic generator is brought into the optimal operational point. Thus, it is possible to ensure that the operational point of the photovoltaic generator is kept at the optimal operational point, and to stably supply a required electric power to the load.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment of the present invention with reference to the accompanying drawings.

Figure 1:
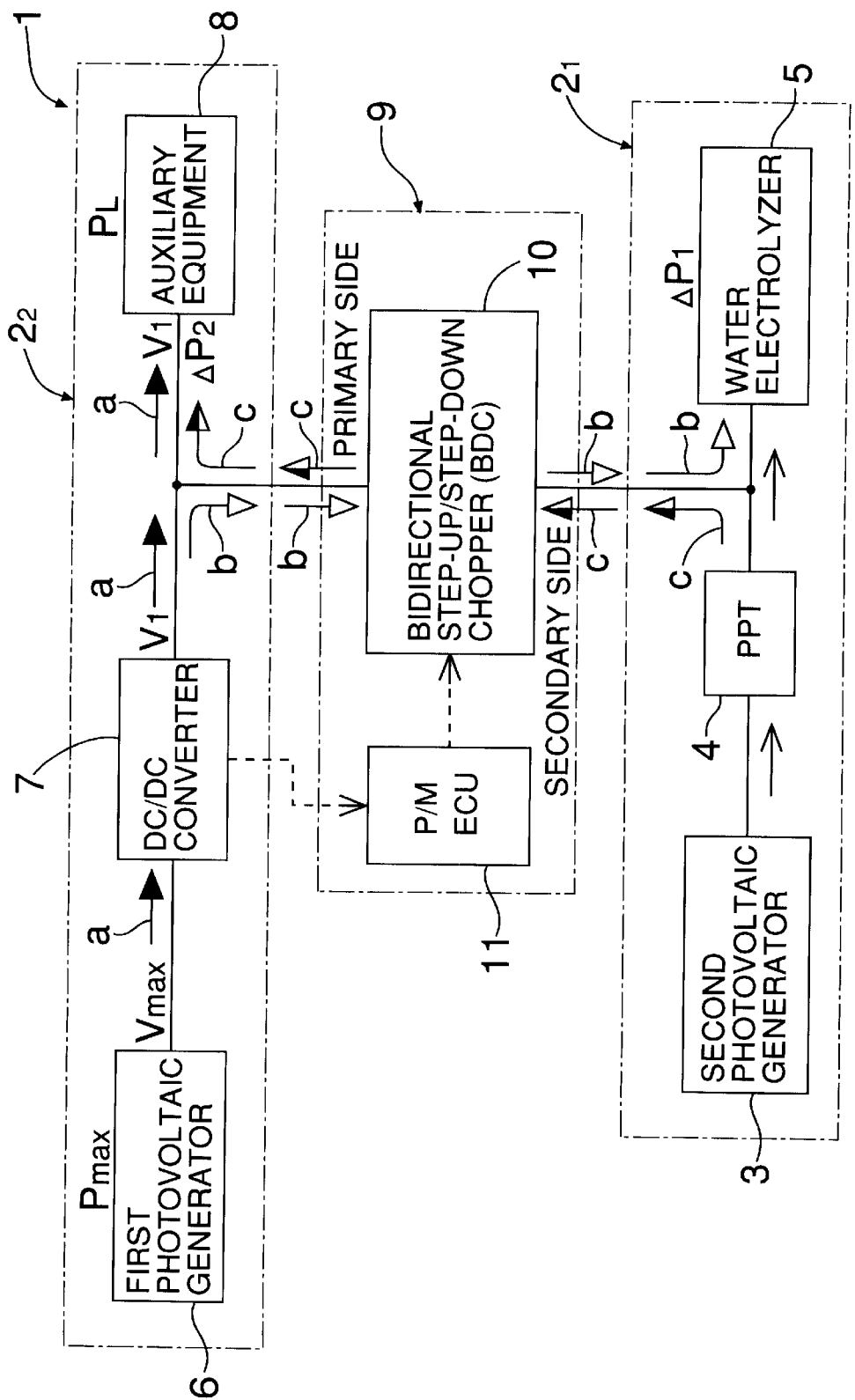
FIG. 1 is a block diagram of a power supply system provided with a photovoltaic generator.

Referring to FIG. 1, a power supply system 1 provided with a photovoltaic generator includes first and second system sections. The second system section is a water electrolytic system section 21 as an electrical system, and includes a low-voltage and high-current type second photovoltaic generator 3 as a power generating device, and a water electrolyzer 5 to which electric power is supplied from the second photovoltaic generator 3 through a peak power tracker (PPT) 4. The first system section is an auxiliary equipment driving system section 22 as an auxiliary system of the water electrolyzer 5, and includes a high-voltage and low-current type first photovoltaic generator 6 as another power generating device, a DC/DC converter 7 for converting the electric power generated by the first photovoltaic generator 6 into a constant-voltage power, and an auxiliary equipment 8 as a constant-power load to which electric power is supplied from the DC/DC converter 7. The auxiliary equipment 8 comprises, for example, an inverter, and a water pump driven by the inverter. In this case, the voltage for operating the auxiliary equipment 8 is higher than that for operating the water electrolyzer 5.

The auxiliary equipment driving system section $2_2$ and water electrolytic system section $2_1$ are connected to each other through a control unit 9, so that the control unit 9 enables the water electrolyzer 5 to receive a portion of the electric power generated by the first photovoltaic generator 6, e.g., the electric power from the DC/DC converter and consume it, and also enables a portion of the electric power generated by the second photovoltaic generator 3 to be supplied to the auxiliary equipment 8.

The control unit 9 includes a bidirectional step-up/step-down chopper as a bidirectional converter ("BDC") 10, and a power management ECU ("P/M ECU") 11. The BDC 10 is connected at its primary side to the auxiliary equipment driving system section $2_2$ and at its secondary side to the water electrolytic system section $2_1$, and exhibits a function of dropping the voltage in a power flow from the primary side to the secondary side and a function of raising the voltage in a power flow from the secondary side to the primary side. The P/M ECU 11 determines the magnitude and polarity of the power flow passing through the BDC 10, based on the electric power input to the DC/DC converter 7.

In the above-described arrangement, the voltage applied to the auxiliary equipment 8 is converted into $V_1$ by the DC/DC converter 7, and the electric power generated by the second photovoltaic generator 3 is supplied through the PPT 4 to the water electrolyzer 5 to conduct the electrolysis of water.

Figure 2:
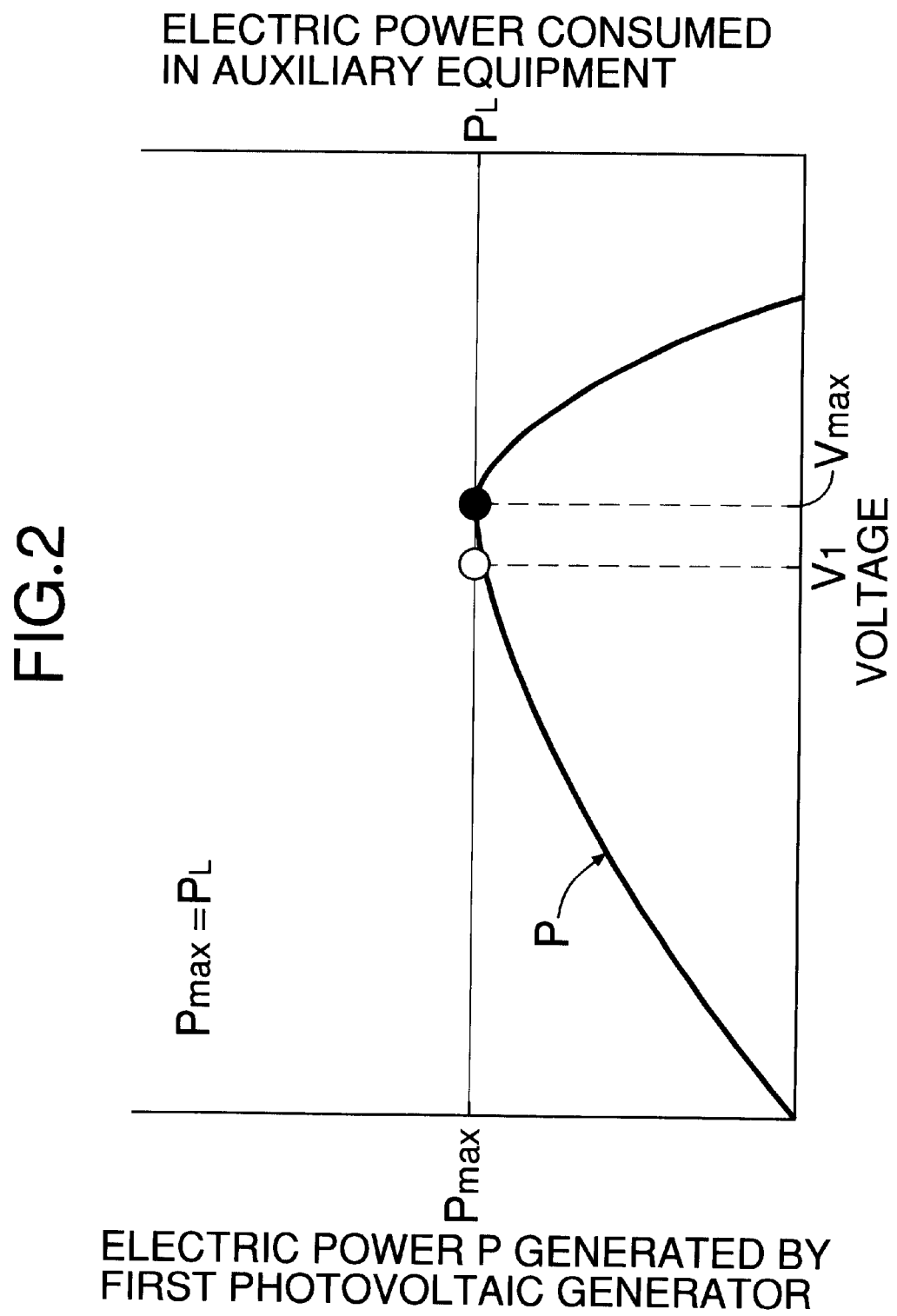
FIG. 2 is a graph for explaining a case where the maximum electric power $P_{max}$ generated by a first photovoltaic generator and the electric power $P_L$ consumed in the auxiliary equipment are equal to each other ($P_{max}=P_L$)

When the maximum power $P_{max}$ generated by the first photovoltaic generator 6 and the power $P_L$ consumed by the auxiliary equipment 8 are equal to each other ($P_{max}=P_L$), as shown in FIG. 2, the electric power generated by the first photovoltaic generator 6 is supplied via the DC/DC converter 7 to the auxiliary equipment 8, as shown by black arrows a in FIG. 1, and hence, the auxiliary equipment 8 is operated. In addition, the current-voltage characteristic coincides with an optimal operational point for the first photovoltaic generator 6 and hence, the operational point of the first photovoltaic generator 6 is an optimal operational point. In this case, the BDC 10 of the control unit 9 need not be operated.

Figure 3:
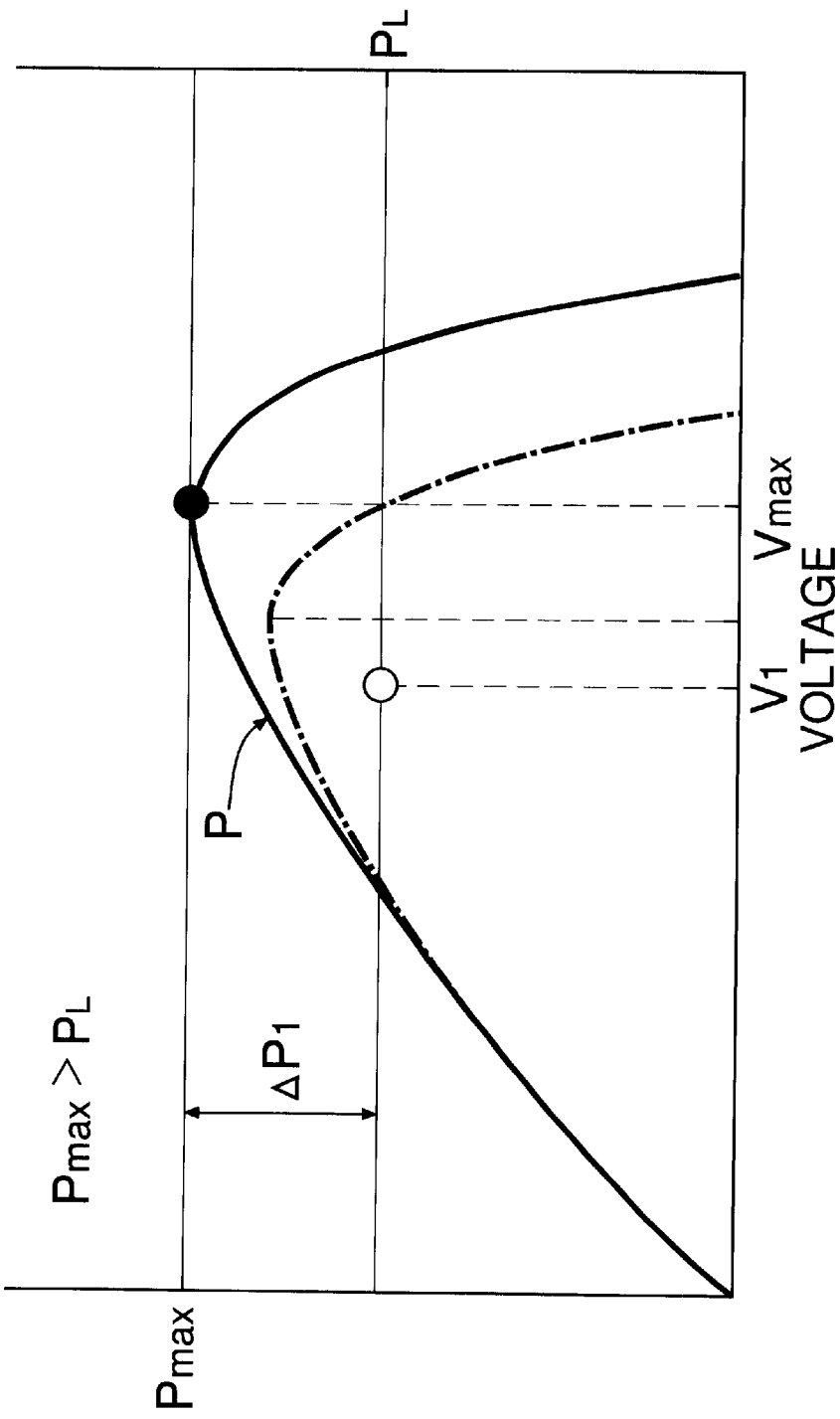
FIG. 3 is a graph for explaining a case where the maximum electric power $P_{max}$ generated by a first photovoltaic generator and the electric power $P_L$ consumed in the auxiliary equipment are in a relation of $P_{max}>P_L$.

When $P_{max}>P_L$, as shown in FIG. 3, the electric power generated by the first photovoltaic generator 6 is supplied via the DC/DC converter 7 to the auxiliary equipment 8, as shown by the black arrows a in FIG. 1 and hence, the auxiliary equipment 8 is operated. However, the current-voltage characteristic does not coincide with the optimal operational point for the first photovoltaic generator 6 and hence, the operational point of the first photovoltaic generator 6 is not the optimal operational point. In such a case, the surplus power $\Delta P_1$ is supplied via the BDC 10 controlled by the P/M ECU 11 to the water electrolyzer 5 of the water electrolytic system section $2_1$, as shown by white arrows b in FIG. 1, where it is consumed. This provides the same state as when the power consumed in the load is equal to $P_L+\Delta P_1$, namely, the current-voltage characteristic of the load corresponds to the optimal operational point for the first photovoltaic generator 6, because $P_{max}=P_L+\Delta P_1$, whereby the operational point of the first photovoltaic generator 6 is the optimal operational point. In the water electrolyzer 5, the amount of hydrogen produced is increased in accordance with the supplying of the surplus power $\Delta P_1$. On the other hand, if the insolation amount is decreased, the electric power generated by the first photovoltaic generator 6 is decreased as shown by a one-dot dashed line in FIG. 3. Then, in accordance with the decrease of the electric power generated by the first photovoltaic generator 6, the surplus power $\Delta P_1$ is decreased by BDC 10.

Figure 4:
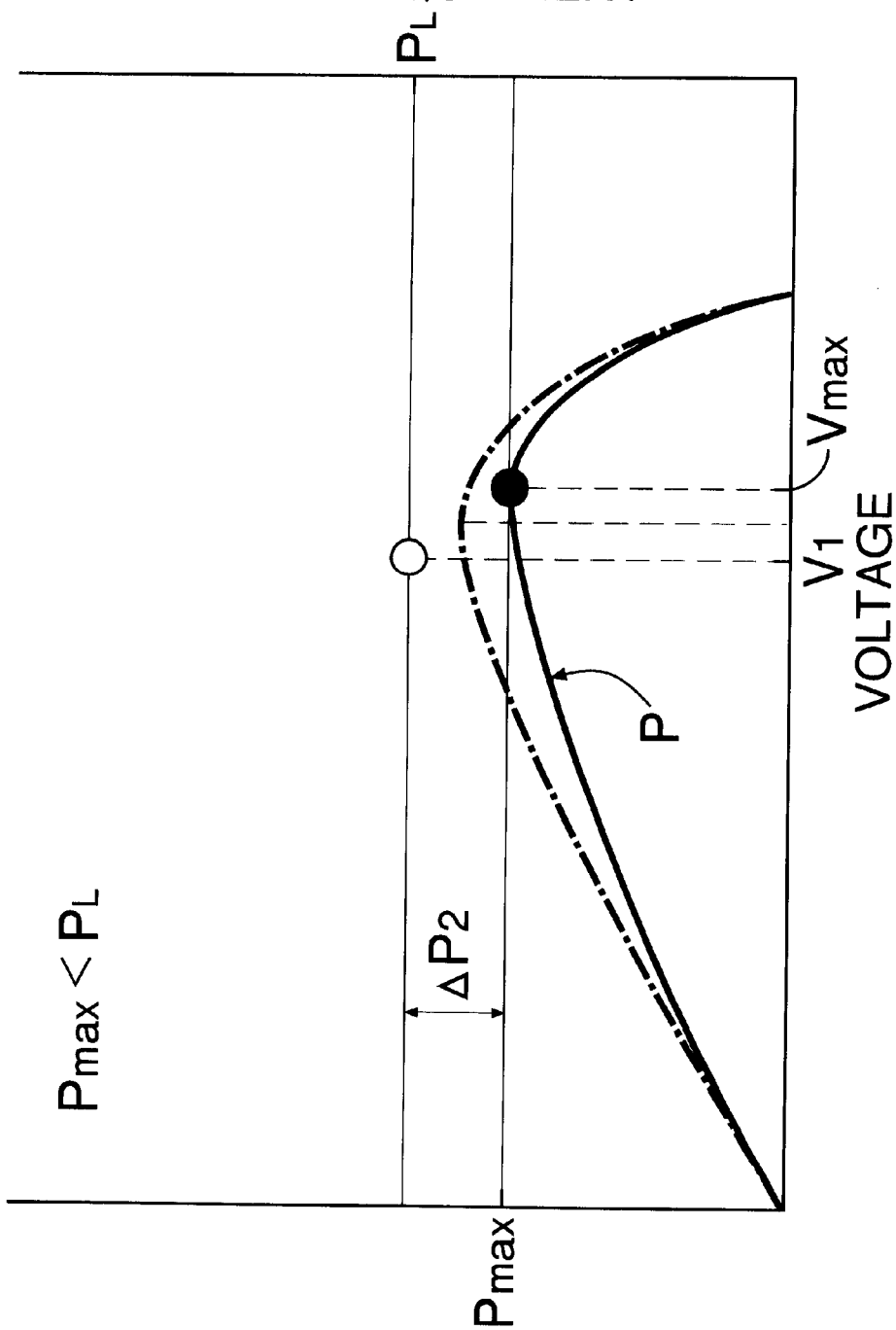
FIG. 4 is a graph for explaining a case where the maximum electric power $P_{max}$ generated by a first photovoltaic generator and the electric power $P_L$ consumed in the auxiliary equipment are in a relation of $P_{max}<P_L$.

If the DC/DC converter 7 is capable of being operated when $P_{max}<P_L$, as shown in FIG. 4, then the electric power generated by the first photovoltaic generator 6 is supplied via the DC/DC converter 7 to the auxiliary equipment 8, as shown by the black arrows a in FIG. 1, but the electric power generated by the first photovoltaic generator 6 is decreased from a range for operating the DC/DC converter 7 and for this reason, the auxiliary equipment 8 is incapable of being operated. In such a case, the deficient power $\Delta P_2$ is supplied from the second photovoltaic generator 3 via the BDC 10 controlled by the P/M ECU 11 to the auxiliary equipment 8, as shown by arrows c black by half and white by half in FIG. 1. Thus, the auxiliary equipment 8 is operated into the same state as when the power consumed in the auxiliary equipment 8 is $P_L-\Delta P_2$. Namely, the current-voltage characteristic of the auxiliary equipment 8 corresponds to the optimal operational point for the first photovoltaic generator 6, because $P_{max}=P_L-\Delta P_2$, whereby the operational point of the first photovoltaic generator 6 is the optimal operational point. If the insulation amount is increased, the electric power generated by the first photovoltaic generator 6 is increased as shown by a single-dotted broken line in FIG. 4.

When the electric power generated by the first photovoltaic generator 6 is decreased suddenly, causing the DC/DC converter 7 to be inoperable, the electric power generated by the first photovoltaic generator 6 is not supplied to the auxiliary equipment 8.

Alternatively, the auxiliary equipment 8 can be designed to withstand a variation in voltage of the first photovoltaic generator 6. Therefore, the DC/DC converter 7 can be omitted by combining annual varying conditions such as the insolation amount, the atmospheric temperature and the like in a place where the system is placed, and the setting of the number of in-series modules of the first photovoltaic generator 6. The electrical system $2_1$ may be an accumulator having a battery.

Although the embodiments of the present invention have been described in detail, it will be understood that the present invention is not limited to the above-described embodiments, and various modifications in design may be made without departing from the spirit and scope of the invention defined in claims.

What is claimed is:

1. A power supply system comprising:
   a first photovoltaic generator for generating power;
   a second photovoltaic generator for generating power;
   a constant-power load for receiving the power generated from the first photovoltaic generator;
   a power consumption source of a predetermined current-voltage characteristic for receiving the power generated by the second photovoltaic generator; and
   a control system that operates to control supply of the power to the load and to the power consumption source;
   wherein the operation of the control system is a function of the maximum electric power ($P_{max}$) generated by the first photovoltaic generator and the electric power ($P_L$) consumed in the load; such that
   when the maximum electric power ($P_{max}$) generated by the first photovoltaic generator is equal to the electric power ($P_L$) consumed by the load ($P_{max}=P_L$), said control system does not operate; and
   when the maximum electric power ($P_{max}$) generated by the first photovoltaic generator is greater than the electric power ($P_L$) consumed by the load ($P_{max}>P_L$), said control system operates to permit the power consumption source to receive a surplus of electric power ($\Delta P_1 = P_{max} - P_L$) from the first photovoltaic generator; and when the maximum electric power ($P_{max}$) generated by the first photovoltaic generator is less than the electric power ($P_L$) consumed by the load ($P_{max} < P_L$), said control system operates to supply the deficient electric power ($\Delta P_2 = P_L - P_{max}$) from the second photovoltaic generator to the load.

2. The power supply system according to claim 1 wherein the first photovoltaic generator is of a high-voltage and low-current type and the second photovoltaic generator is of a low-voltage and high-current type.

3. The power supply system according to claim 2 further comprising a DC/DC converter which converts the electric power generated by the first photovoltaic generator into a constant-voltage power and supplies the converted power to the load.

4. The power supply system according to claim 3 wherein the control system includes a bidirectional converter provided between the first and second photovoltaic generators and a power management ECU for determining the magnitude and polarity of the electric power flow through the bidirectional converter, based on the electric power generated by the first photovoltaic generator.

5. The power supply system according to claim 4 wherein the power consumption source is a water electrolyzer and the load is an auxiliary equipment of the water electrolyzer, wherein an operating voltage for the auxiliary equipment is higher than that for the water electrolyzer.

6. The power supply system according to claim 5 wherein the auxiliary equipment comprises an inverter and a water pump.

7. The power supply system according to claim 4 wherein the power consumption source is an accumulator.

8. The power supply system according to claim 1 wherein the control system includes a bidirectional converter provided between the first and second photovoltaic generators and a power management ECU for determining the magnitude and polarity of the electric power flow through the bidirectional converter, based on the electric power generated by the first photovoltaic generator.

9. The power supply system according to claim 8 wherein the power consumption source is a water electrolyzer and the load is an auxiliary equipment of the water electrolyzer, wherein an operating voltage for the auxiliary equipment is higher than that for the water electrolyzer.

10. The power supply system according to claim 2 wherein the control system includes a bidirectional converter provided between the first and second photovoltaic generators and a power management ECU for determining the magnitude and polarity of the electric power flow through the bidirectional converter, based on the electric power generated by the first photovoltaic generator.

11. The power supply system according to claim 10 wherein the power consumption source is a water electrolyzer and the load is an auxiliary equipment of the water electrolyzer, wherein an operating voltage for the auxiliary equipment is higher than that for the water electrolyzer.

12. The power supply system according to claim 1 further comprising a DC/DC converter which converts the electric power generated by the first photovoltaic generator into a constant-voltage power and supplies the converted power to the load.

13. The power supply system according to claim 12 wherein the control system includes a bidirectional converter provided between the first and second photovoltaic generators and a power management ECU for determining the magnitude and polarity of the electric power flow through the bidirectional converter, based on the electric power generated by the first photovoltaic generator.

14. The power supply system according to claim 13 wherein the power consumption source is a water electrolyzer and the load is an auxiliary equipment of the water electrolyzer, wherein an operating voltage for the auxiliary equipment is higher than that for the water electrolyzer.

15. The power supply system according to any one of claims 1 to 14 further comprising a PPT (Peak Power Tracker) provided between the second photovoltaic generator and the power consumption source.

16. A power supply system comprising:

a first system section including a first photovoltaic generator for generating power and a constant-power load for receiving the power generated from the first photovoltaic generator;

a second system section including a second photovoltaic generator for generating power and a power consumption source of a predetermined current-voltage characteristic for receiving the power generated by the second photovoltaic generator; and a control system that operates to control supply of the power to the load and to the power consumption source;

wherein the operation of the control system is a function of the maximum electric power ($P_{max}$) generated by the first photovoltaic generator and the electric power ($P_L$) consumed in the load; such that when the maximum electric power ($P_{max}$) generated by the first photovoltaic generator is equal to the electric power ($P_L$) consumed by the load ($P_{max} = P_L$), said control system does not operate; and when the maximum electric power ($P_{max}$) generated by the first photovoltaic generator is greater than the electric power ($P_L$) consumed by the load ($P_{max} > P_L$), said control system operates to permit the power consumption source to receive a surplus of electric power ($\Delta P_1 = P_{max} - P_L$) from the first photovoltaic generator; and when the maximum electric power ($P_{max}$) generated by the first photovoltaic generator is less than the electric power ($P_L$) consumed by the load ($P_{max} < P_L$), said control system operates to supply the deficient electric power ($\Delta P_2 = P_L - P_{max}$) from the second photovoltaic generator to the load.

17. The power supply system according to claim 16 wherein the first photovoltaic generator is of a high-voltage and low-current type and the second photovoltaic generator is of a low-voltage and high-current type.

18. The power supply system according to claim 17 further comprising a DC/DC converter which converts the electric power generated by the first photovoltaic generator into a constant-voltage power and supplies the converted power to the load.

19. The power supply system according to claim 18 wherein the control system includes a bidirectional converter provided between the first and second system sections and a power management ECU for determining the magnitude and polarity of the electric power flow through the bidirectional converter, based on the electric power generated by the first photovoltaic generator.

20. The power supply system according to claim 19 wherein the power consumption source is a water electrolyzer and the load is an auxiliary equipment of the water electrolyzer, wherein an operating voltage for the auxiliary equipment is higher than that for the water electrolyzer.

* * * * *